(12) United States Patent
Yamashita et al.

(10) Patent No.: US 6,375,728 B2
(45) Date of Patent: *Apr. 23, 2002

(54) INK FOR INK JET RECORDING AND INK JET RECORDING METHOD

(75) Inventors: Yoshiro Yamashita; Hiroshi Inoue; Ken Hashimoto, all of Kanagawa (JP)

(73) Assignee: Fuji Xerox Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/250,181

(22) Filed: Feb. 16, 1999

(30) Foreign Application Priority Data

Feb. 17, 1998 (JP) .......................... 10-051383

(51) Int. Cl.⁷ .............................. C09D 11/02
(52) U.S. Cl. ................. 106/31.6; 106/31.65; 106/31.86
(58) Field of Search ................. 106/31.6, 31.86, 106/31.65

(56) References Cited

U.S. PATENT DOCUMENTS

| 5,085,698 | A | | 2/1992 | Ma et al. ............... 106/31.6 |
|---|---|---|---|---|
| 5,104,448 | A | * | 4/1992 | Kruse ................... 106/31.58 |
| 5,160,370 | A | * | 11/1992 | Suga et al. ............ 106/31.86 |
| 5,571,311 | A | | 11/1996 | Belmont et al. ......... 106/31.6 |
| 5,609,671 | A | * | 3/1997 | Nagasawa ............... 106/31.65 |
| 5,746,818 | A | * | 5/1998 | Yatake ................. 106/31.86 |
| 6,004,389 | A | * | 12/1999 | Yatake ................. 106/31.86 |

FOREIGN PATENT DOCUMENTS

| JP | 56-147869 | 11/1981 |
|---|---|---|
| JP | 2-255875 | 10/1990 |
| JP | 8-3498 | 1/1996 |
| JP | 8-81646 | 3/1996 |

\* cited by examiner

*Primary Examiner*—Helene Klemanski
(74) *Attorney, Agent, or Firm*—Finnegan, Henderson, Farabow, Garrett, & Dunner LLP

(57) ABSTRACT

Disclosed is an ink for ink jet recording comprising water, a pigment that is self-dispersible-in-water, and a water-soluble organic solvent, wherein said ink for ink jet recording contains a water-soluble organic compound having an S.P. value of 12 or less and a surface tension at 25° C. of less than 40 mN/m in an amount of from 3.0 to 15.0 wt % based on the entire weight of the ink. Also, disclosed are a method for producing the ink and an ink jet recording method by using the ink.

17 Claims, No Drawings

INK FOR INK JET RECORDING AND INK JET RECORDING METHOD

FIELD OF THE INVENTION

The present invention relates to an ink for ink jet recording for use in ink jet system recording apparatuses (e.g., printer, copying machine, facsimile, word processor, plotter), a method for producing the ink, and an ink jet recording method using the ink.

BACKGROUND OF THE INVENTION

Recording apparatuses using a so-called ink jet system in which a liquid or fused solid ink is ejected from nozzle, slit, porous film or the like to make recording on a recording material such as paper, cloth or film are advantageous in that the apparatus is compact, inexpensive and noiseless. Accordingly, various investigations are being made thereon. In recent years, a large number of products are commercially available and predominating in the field of recording apparatus, where not only black single color recording but also full color recording with good print quality can be obtained on a so-called plain paper such as report paper or copy paper.

In usual, the ink for use in ink jet recording apparatuses mainly comprises a solvent, a coloring material and additives. The ink for ink jet recording is required to have the following properties:

(1) that a high-resolution and high-density uniform image can be obtained without causing blotting or fogging on paper;

(2) that clogging of a nozzle tip due to drying of the ink does not occur and ejection responsibility and ejection stability are always kept in good condition;

(3) that the ink on paper exhibits good drying property;

(4) that the image has good fastness; and (5) that high stability is ensured in the long-term storage.

In order to satisfy these requirements, various techniques have been proposed. For example, (3) the drying property of the ink on paper is important for achieving high-speed printing in the recording apparatus or in the case of color printing, for preventing color mixing and improvement of this drying property has been heretofore made by using a solvent having a high permeability or volatility or by adding a surfactant.

With respect to (4) the fastness of the image, a large number of inks have been disclosed where the water resistance is improved by using a pigment in place of a dye as a coloring material (see, JP-A-56-147869 (the term "JP-A" as used herein means an "unexamined published Japanese patent application"), JP-A-2-255875, U.S. Pat. No. 5,085, 698). When a pigmented ink is used, the water resistance may be improved, however, the ink is disadvantageously inferior to a dyed ink in the rub resistance. Furthermore, when a pigmented ink is used, the long-term storage stability (5) is generally deteriorated as compared with dyed inks.

In order to solve these problems with the use of a pigment, for example, U.S. Pat. No. 5,571,311 discloses a method of coupling a substituent having a water solubilization group with carbon black, JP-A-8-81646 discloses a method of polymerizing a water-soluble monomer or the like to the carbon black surface, and JP-A-8-3498 discloses a method of oxidation treating carbon black.

However, an ink for ink jet recording having good long-term storage stability and fast drying property on a plain paper and capable of giving an image having good print quality and excellent water resistance/rub resistance has not yet been found.

SUMMARY OF THE INVENTION

Accordingly, the object of the present invention is to solve these problems in conventional techniques and provide an ink having good long-term storage stability and fast drying property on a plain paper and capable of giving an image having good print quality and excellent water resistance/rub resistance.

The present inventors have found that when an ink for ink jet recording comprising water, a water-soluble organic solvent and a water self-dispersible pigment (i.e., a pigment that is self-dispersible-in-water) contains a water-soluble organic compound having an S.P. value of 12 or less and a surface tension at 250° C. of less than 40 mN/m in an amount of from 3.0 to 15.0 wt % based on the entire weight of the ink, the above-described object can be obtained. The present invention has been accomplished based on this finding.

More specifically, the present invention consists of:

an ink for ink jet recording comprising water, a water self-dispersible pigment and a water-soluble organic solvent, wherein the ink for ink jet recording contains a water-soluble organic compound having an S.P. value of 12 or less and a surface tension at 25° C. of less than 40 mN/m in an amount of from 3.0 to 15.0 wt % based on the entire weight of the ink;

a process for producing an ink for ink jet recording, comprising a step of dispersing a water self-dispersible pigment in water using an ultrasonic homogenizer or high-pressure homogenizer and a step of mixing the pigment dispersed with water, a water-soluble solvent and a water-soluble organic compound having an S.P. value of 12 or less and a surface tension at 25° C. of less than 40 mN/m; and an ink jet recording method comprising ejecting the above-described ink from an orifice in response to a recording signal.

DETAILED DESCRIPTION OF THE INVENTION

The present invention is described in detail below.

The "water self-dispersible pigment" as used in the present invention means a pigment having a large number of water solubilization groups on the surface thereof and capable of stable dispersion even in the absence of a dispersant. The "water self-dispersible pigment" of the present invention may be any pigment if the pigment satisfies the condition such that when a pigment is dispersed in water by means of a dispersing machine such as ultrasonic homogenizer, nanomizer, microfluidizer or ball mill without using a dispersant to have a concentration of water/pigment being 95 wt %/5 wt % and thereafter the dispersion solution placed in a glass bottle is allowed to stand for 1 day, the pigment concentration in a supernatant obtained is 98% or more of the initial pigment concentration measured immediately after the preparation of the dispersion solution.

The "water self-dispersible pigment" of the present invention can be usually produced by applying a surface modification treatment to a normal pigment, such as acidbase treatment, coupling agent treatment, polymer graft treatment, plasma treatment or oxidation and reduction treatment. The pigment subjected to such a surface treatment is increased in the number of water solubilization groups therein than usual and can be dispersed by itself. Preferred examples of the normal pigment subjected to the surface modification treatment include carbon black such as Raven 5250, Raven 3500, Raven 5750, Raven 1080, Regal 330R, Mogul L, Monarch 1000, Color Black FW2, Black Pearl L, Printex V, Special Bk 4A and Mitsubishi Chemical No. 25. Other examples of the pigment which can be used include cyan pigments such as C.I. Pigment Blue 1, C.I. Pigment Blue 3, C.I. Pigment Blue 15, C.I. Pigment Blue 15-3, C.I. Pigment Blue 16 and C.I. Pigment Blue 60; magenta pigments such as C.I. Pigment Red 5, C.I. Pigment Red 12, C.I. Pigment Red 48, C.I. Pigment Red 112, C.I. Pigment Red 122, C.I. Pigment Red 146, C.I. Pigment Red 168 and C.I. Pigment Red 202; and color pigments such as C.I. Pigment Yellow 1, C.I. Pigment Yellow 2, C.I. Pigment Yellow 3, C.I. Pigment Yellow 13, C.I. Pigment Yellow 16, C.I. Pigment Yellow 73, C.I. Pigment Yellow 83, C.I. Pigment Yellow 98, C.I. Pigment Yellow 114, C.I. Pigment Yellow 128 and C.I. Pigment Yellow 154.

Furthermore, a commercially available water self-dispersible pigment may be used as it is as the "water self-dispersible pigment" for use in the present invention. Examples of such a commercially available water self-dispersible include Cab-o-jet-200, Cab-o-jet-300, IJX-55 (all produced by Cabot Co.) and Microjet Black CW-1 (produced by Orient Kagaku KK).

The water solubilization group contained in the water self-dispersible pigment may be nonionic, cationic or anionic and predominantly, a sulfonic acid, a carboxylic acid, a hydroxyl group, a phosphoric acid and the like are preferably added. In the case of a sulfonic acid, a carboxylic acid or a phosphoric acid, the free acid as it is may be used but the acid may be formed into a salt and in this case, the counter ion of the acid in general is preferably $Li^+$, $Na^+$, $K^+$, $NH_4^+$ or an organic amine.

In the present invention, the water self-dispersible pigment is preferably contained in an amount of from 0.1 to 20 wt %, more preferably from 0.5 to 15 wt %, still more preferably from 1 to 10 wt %, based on the entire ink weight. If the pigment content exceeds 20 wt %, clogging is readily generated at a nozzle tip, whereas if it is less than 0.1 wt %, a sufficiently high optical density cannot be obtained.

The water self-dispersible pigment in the ink preferably has a number average dispersion particle size of from 15 to 100 nm, more preferably from 15 to 50 nm. When the number average dispersion particle size is present in this range, clogging hardly occurs and excellent storage stability can be attained. If the number average dispersion particle size is less than 15 nm, the surface area per the particle unit volume becomes large and probably because the contact area between particles in the ink tends to increase, the ink viscosity elevates and clogging is readily generated, whereas if the average particle size exceeds 100 nm, unstable dispersion is liable to result and this gives rise to agglomeration and then precipitation of the pigment.

The water self-dispersible pigment preferably has a dispersion particle size distribution (a ratio of the volume average dispersion particle size to the number average dispersion particle size) of 3.5 or less, more preferably 2.5 or less. If the dispersion particle size distribution exceeds 3.5, some large dispersion particles serve as a core and the pigment is liable to readily undertake agglomeration and then precipitation even if the number average dispersion particle size falls within the above-described range. By adding "a water-soluble organic compound having an S.P. value of 12 or less and surface tension of less than 40 mN/m" for use in the present invention in an amount of from 3.0 to 15.0 wt % based on the entire ink weight, the dispersion particle size distribution can be settled to be 3.5 or less.

In the case of using an ink jet recording system characterized in that the ink is ejected by the action of heat energy, the number of particles having a particle size of >0.5 µm contained in the ink is preferably controlled to be $\leq 6 \times 10^{10}$ particles/dm$^3$, more preferably $\leq 3 \times 10^{10}$ particles/dm$^3$, so as to prevent kogation on the heater. In order to control the number of particles having a particle size of >0.5 µm to fall within the above-described range, a step for removing coarse particles by centrifugal separation or filtration is preferably included in the production process of the ink. If the number of particles having a particle size of >0.5 µm contained in the ink exceeds $6 \times 10^{10}$ particles/dm$^3$, this may cause clogging or precipitation of the pigment during the storage or kogation on the heater may be accelerated to reduce the drop volume. In the case when a large amount of a surfactant is used so as to reduce the drying time, the number of particles is liable to increase in the normal pigment dispersion system, however, by using the self-dispersible pigment, the number of particles having a particle size of >0.5 µm can be suppressed from increasing.

The water-soluble organic compound for use in the present invention has an S.P. value (solubility parameter) of 12 or less, preferably from 8 to 12. If the S.P. value exceeds 12, the drying time is prolonged, whereas if it is less than 8, the solubility in water readily decreases.

Also, the water-soluble organic compound for use in the present invention has a surface tension at 25° C. of less than 40 mN/m, preferably from 20 to less than 40 mN/m. If the surface tension is 40 mN/m or more, the wettability to the recording material turns to worse and the drying property or rub resistance cannot be improved, whereas if it is less than 20 mN/m, the ink is excessively wetted to the recording material, as a result, blotting or strike through is readily generated.

Furthermore, the water-soluble organic compound for use in the present invention preferably has a molecular weight of less than 400. If the molecular weight is 400 or more, the nozzle disadvantageously exhibits bad clogging property.

The water-soluble organic compound satisfying these requirements is preferably, in view of the pigment dispersion stability, a compound represented by R-O-X$_n$H (wherein R is a functional group selected from the group consisting of alkyl having 1 to 8 carbon atoms, alkenyl having 1 to 8 carbon atoms, alkynyl having 1 to 8 carbon atoms, phenyl, alkylphenyl having 7 to 8 carbon atoms and cycloalkyl having 3 to 8 carbon atoms, X is oxyethylene or oxypropylene, and n is an integer of from 1 to 8). In the formula above, R is preferably a functional group having from 3 to 6 carbon atoms and n is preferably an integer of from 1 to 6. Examples of the compound having a structure represented by the above-described formula include ethylene glycol monobutyl ether, ethylene glycol monopropyl ether, diethylene glycol monobutyl ether, diethylene glycol monohexyl ether, diethylene glycol monopropyl ether, dipropylene glycol monopropyl ether, dipropylene glycol monobutyl ether, propylene glycol monobutyl ether, propylene glycol monopropyl ether, triethylene glycol monobutyl ether and diethylene glycol monophenyl ether. Of these, diethylene glycol monobutyl ether, diethylene glycol monohexyl ether, propylene glycol monobutyl ether and triethylene glycol monobutyl ether are preferred.

The ink for ink jet recording of the present invention contains such a water-soluble organic compound in an amount of from 3.0 to 15.0 wt %, preferably from 3.0 to 10.0 wt %, based on the entire weight of the ink. If the content is less than 3.0 wt %, the permeation effect cannot be satisfactorily brought out, then drying speed becomes lower. If the content is more than 15.0 wt %, there arise troubles, for example, blotting is easily generated or the water self-dispersible pigment is reduced in the dispersion stability.

The water-soluble organic solvent for use in the present is not particularly limited as far as it is used for preventing evaporation of water in the ink for ink jet recording. Examples of the water-soluble organic solvent which can be used include polyhydric alcohols such as ethylene glycol, diethylene glycol, propylene glycol, polyethylene glycol, triethylene glycol, glycerin, trimethylolpropane, 1,2,6-hexanetriol, 1,5-pentanediol and dipropylene glycol; saccharides such as glucose, fructose, galactose, mannose and xylose; sulfur-containing solvents such as thiodiethanol, 2-mercaptoethanol, thioglycerol, sulfolane and dimethylsulfoxide; and nitrogen-containing solvents such as 2-pyrrolidone, N-methyl-2-pyrrolidone, cyclohexylpyrrolidone, monoethanolamine, triethanolamine and diethanolamine. Of these, ethylene glycol, diethylene glycol, propylene glycol, glycerin, thiodiethanol, sulfolane, 2-pyrrolidone and N-methyl-2-pyrrolidone are preferred. These solvents may be used either individually or in combination of two or more thereof. The content of the water-soluble organic solvent is preferably from about 1 to about 60 wt %, more preferably from about 3 to about 50 wt %, based on the entire weight of the ink. If the content exceeds 60 wt %, the viscosity of the ink increases and in turn the ejection stability and ejection responsibility decrease, whereas if it is less than 1 wt %, the evaporation of water cannot be satisfactorily prevented and clogging readily occurs in some cases.

The water for use in the present invention is not particularly limited, however, pure water is preferred. The water is preferably contained in an amount of from 35 to 95 wt % based on the entire weight of the ink. If the content is less than 35 wt %, the water self-dispersible pigment may be deteriorated in the dispersion stability or the viscosity of the ink increases to lower the ejection stability in some cases, whereas if it exceeds 95 wt %, the water is liable to evaporate in a large amount at the distal end of a nozzle and the nozzle may be clogged.

The ink for ink jet recording of the present invention may contain an ejection stabilizer such as urea, thiourea, ethylene urea, ethylene thiourea, methyl urea, dimethyl urea and methyl thiourea, and these ejection stabilizers may be used individually or in combination of two or more thereof. The content of the ejection stabilizer is preferably from about 0.5 to about 15 wt %, more preferably from 1 to about 10 wt %, based on the weight of the ink.

Furthermore, the ink for ink jet recording of the present invention may contain a surfactant and examples of the surfactant which can be used include nonionic surfactants such as polyoxyethylene alkylphenyl ether, polyoxyethylene alkyl ether, polyoxyethylene fatty acid ester, sorbitan fatty acid ester, polyoxyethylene sorbitan fatty acid ester, polyoxyethylene glycerin fatty acid ester, polyglycerin fatty acid ester, polyoxyethylene sorbitol fatty acid ester, polyoxyethylene sterol, polyoxyethylene polyoxypropylene ether, polyoxyethylene fatty acid amide, polyoxyethylene polyoxypropylene block copolymer, tetramethyldecynediol and tetramethyldecynediol ethylene oxide adduct; anionic surfactants such as alkylbenzene-sulfonate, alkylphenylsulfonate, alkylnaphthalenesulfonate, higher fatty acid salt, sulfate of higher fatty acid ester, sulfonate of higher fatty acid ester, sulfate of higher alcohol ether, sulfonate, higher alkyl sulfosuccinate, formalin condensate of naphthalene sulfonate, polystyrene-sulfonate, polyacrylate, polyoxyethylene alkyl ether phosphate, alkyl ether carboxylate, alkylsulfate and acrylic acid-acrylic acid ester copolymer; silicone-based surfactants such as polysiloxane polyoxyethylene adduct; fluorine-based surfactants such as perfluoroalkyl carboxylate, perfluoroalkyl sulfonate and oxyethylene perfluoroalkyl ether; and biosurfactants such as spiculisporic acid, rhamnolipid and lysolecithin. These surfactants may be used individually or in combination of two or more thereof.

Taking account of the dispersion stability of the pigment, the surfactant preferably has an HLB of from 5 to 25. The amount of the surfactant added is preferably from about 0.001 to about 1 wt %, more preferably about 0.005 to about 0.5 wt %, based on the entire weight of the ink. The surfactant contributes to the improvement in the wiper cleaning property of the ink jet head.

The ink for ink jet recording of the present invention may contain a pH adjusting agent and examples thereof include acids such as hydrochloric acid, sulfuric acid, nitric acid, acetic acid, citric acid, oxalic acid, malonic acid, boric acid, phosphoric acid, phosphorous acid and lactic acid, and bases such as sodium hydroxide, potassium hydroxide, lithium hydroxide and ammonia. Also, the ink for ink jet recording of the present invention may contain a buffer such as phosphate, oxalate, amine salt or good's buffer. The pH of the ink for ink jet recording of the present invention is preferably, in view of the ink storage stability or erosion of the head or cartridge part, from 4 to 12, more preferably from 5 to 11.

The ink for ink jet recording of the present invention may contain a solubilizing agent such as acetamide and betaine, a physical property conditioner such as polyethyleneimine, a polyamine, polyvinyl pyrrolidone, polyethylene glycol or cellulose derivative, and a clathrate compound such as cyclodextrin, polycyclodextrin, a large ring amine or a crown ether. Furthermore, the ink for ink jet recording of the present invention may contain, if desired, an antimold, an anticorrosion, a microbicide, an antioxidant, a chelating agent, a dendrimer or a polymer emulsion.

The ink for ink jet recording of the present invention is characterized in that the drying time is less than 5 seconds at the printing of a solid image having an image area ratio of 100% on a plain paper. The "solid image having an image area ratio of 100%" as used in the present invention means a solid image where the ink amount is approximately from 1.2 to 2.0 mg/cm$^2$ per the unit area. The drying time of less than 5 seconds can be achieved by adding a water-soluble organic compound having an S.P. value of 12 or less and a surface tension at 25° C. of less than 40 mN/m in an amount of from 3.0 to 15.0 wt % as described above.

The ink for ink jet recording of the present invention preferably has a stationary flow viscosity of from 1.8 to 4.0 mpas. If the stationary flow viscosity is less than 1.8 mPas, the ink readily falls from the nozzle and at the same time, pigment particles become free to move and readily agglomerate, whereas if it exceeds 4.0 mPas, resistance against ejection force increases.

The ink for ink jet recording of the present invention preferably has a surface tension of form 20 to 40 mN/m. If the surface tension is less than 20 mN/m, blotting and strike through is generated, whereas if it exceeds 40 mN/m, drying time property becomes worse.

The ink for ink jet recording of the present invention preferably has an electric conductivity of from 0.03 to 0.4

S/m, more preferably from 0.05 to 0.3 S/m. If the electric conductivity is less than 0.03 S/m, insufficient dissociation proceeds on the surface of the self-dispersible pigment and poor dispersibility results, whereas if it exceeds 0.4 S/m, the electric double layer formed around the pigment particle has a small thickness and due to the small distance between particles, the pigment is deteriorated in the dispersibility. Accordingly, it is preferred to reduce the electrolyte other than the self-dispersible pigment as much as possible.

Incidentally, if the Mg and Fe contents in the ink increase, agglomeration of the pigment is accelerated and when the ink is used in the recording system where the ink is ejected by the action of heat energy, kogation on the heater is liable to increase. Accordingly, the Mg and Fe contents each is preferably controlled to be less than 5 ppm. Mg and Fe may be removed by the operation such as water washing, filtration through reverse osmosis membrane/ultrafilter or the like, separation by ion exchange resin, or adsorption to activated carbon/zeolite or the like. These operations may be used individually or in combination. Mg and Fe dissolve out mainly from the pigment and accordingly, these may be removed by an effective and appropriate method in respective stages of pigment itself, pigment dispersion solution and ink.

The process for producing an ink for ink jet recording of the present invention is described below.

For the purpose of preventing dissolving out of Mg and Fe, the production process of an ink for ink jet recording of the present invention preferably includes a step of dispersing the pigment by an ultrasonic homogenizer or high-pressure homogenizer without using a dispersion media. Furthermore, the production process preferably includes a step of removing coarse particles by centrifugal separation. As described above, if the ink contains a large number of particles having a particle size of >0.5 μm, the dispersion becomes unstable or kogation on the heater increases. When a step of removing coarse particles by centrifugal separation is provided, the coarse particles can be efficiently removed. At the time of centrifugal separation, coarse particles can be more effectively removed as the pigment concentration is lower.

Accordingly, the process for producing an ink for ink jet recording of the present invention preferably comprises a step of dispersing a water self-dispersible pigment in water by means of an ultrasonic homogenizer or high-pressure homogenizer without using a dispersion media and a step of mixing the pigment dispersed and other materials such as water, a water-soluble organic solvent and a water-soluble organic compound, and more preferably further comprises a step of removing coarse particles by centrifugal separation.

The ink jet recording method of the present invention is described below.

The ink jet recording method of the present invention is characterized in that the recording is performed on a recording material by ejecting an ink for ink jet recording of the present invention in response to a recording signal.

In a preferred embodiment, the ink is ejected by the action of heat energy upon the ink, so that kogation on the heater can be reduced. Furthermore, by applying a plurality of pulses and thereby forming and ejecting one ink droplet, the drop amount is stabilized and the ejection stability at the continuous ejection can be increased. As the drop on printing is made smaller to elevate the ink jet recording resolution, the effect of improving the image quality and drying property becomes larger. In particular, the amount of ink ejected per one drop is preferably 20 ng or less, more preferably 15 ng or less. This phenomenon seems to occur because the specific surface area of drops increases and therefore, the effect on the surface is intensified.

Moreover, by mixing the ink for ink jet recording of the present invention and a fixing agent on a recording material, a high-resolution, high-density and highly fixed image can be obtained. The fixing agent is a material used for preventing permeation of a coloring material in the ink. Examples of the fixing agent which can be used include a polyvalent metal salt, an organic amine and a salt thereof, a quaternary ammonium salt, a cationic polymer, a nonionic polymer and an anionic polymer. The fixing agent in the form of an aqueous solution or the like may be coated on a recording material before or after the ink recording or simultaneously with the ink recording. For the coating of the fixing agent, a method of ejecting the fixing agent from an orifice in response to a signal and coating it on a recording material is effective and efficient similarly to the ink.

(Mode of Operation)

As described in the foregoing, according to the present invention, the ink for ink jet recording comprising water, a water-soluble organic solvent and a water self-dispersible pigment, contains a water-soluble organic compound having an S.P. value of 12 or less and a surface tension at 25° C. of less than 40 mN/m in an amount of from 3.0 to 15.0 wt % based on the weight of the ink. By virtue of this constitution, the ink for ink jet recording having a drying time of less than 5 seconds at the printing of a solid image having an image area ratio of 100% on a plain paper can be obtained. The ink for ink jet recording of the present invention is advantageous in that drying on a paper is fast, the water resistance and rub resistance both are excellent, the long-term storage stability is high, the print quality is good and problems of clogging and the like are not caused.

The mechanism of these effects obtained by adding a water self-dispersible pigment and a water-soluble organic compound having an S.P. value of 12 or less and a surface tension at 25° C. of less than 40 mN/m in combination is not fully elucidated but it is presumed as follows. With respect to the dispersion stability of the ink, although a pigment which is insoluble in water is usually dispersed and prevented from agglomeration and precipitation using the action of a dispersant adsorbed to the pigment in the case of a normal pigment dispersed ink, the pigment is dispersed by itself without using a dispersant in the present invention where a water self-dispersible pigment is used. When a large amount of penetrant is present in the ink and the interaction between the penetrant and the dispersant is strong, the dispersant adsorbed to the pigment is considered to gradually dissociate from the pigment and thereby agglomeration and precipitation of the pigment is caused. This problem is not incurred in the case of a water self-dispersible pigment. With respect to the drying property and print quality, it is considered that the pigment has a large particle size as compared with a dye and difficultly passes through voids in the recording material even with the same penetrant, as a result, excess permeation is prevented and blotting is reduced despite the fast drying. With respect to the rub resistance, although the wettability to the recording material is poor in the case of an ink having a high surface tension, the surface tension of the ink is 40 mN/m or less in the present invention and by virtue of this, it is considered that the contact area between the ink and the recording material is increased and the fixing property is improved. With respect to the clogging, as compared with normal pigment dispersed ink, the ink of the present invention is less subject to the adverse effect by the interaction between the dispersant and the penetrant at the time of the penetrant ratio increasing on the nozzle surface and this seems to work advantageously.

The present invention is described in greater detail below by referring to the Examples.

EXAMPLE 1

Microjet Black CW-1 (produced by Orient KK) was diluted with water to have a carbon concentration of 10 wt % and then subjected to centrifugal separation (7,000 r.p.m., 30 minutes) to obtain a pigment dispersion solution (carbon concentration: 8.3 wt %).

| | |
|---|---|
| Pigment dispersion solution obtained above | 50 parts by weight |
| Glycerin (S.P. value: about 20) | 15 parts by weight |
| Diethylene glycol monobutyl ether (S.P. value: about 10.5, γ (surface tension) = 34 mN/m) | 5 parts by weight |
| N,N-Bis(2-hydroxyethyl)-2 aminomethylethanesulfonic acid | 0.5 parts by weight |
| NaOH | 0.1 part by weight |
| Pure water | 29.4 parts by weight |

Respective components shown above were thoroughly mixed and then filtered under pressure through a 1-μm filter to prepare an ink.

EXAMPLE 2

Cab-o-jet-300 (produced by Cabot Co.) was subjected to centrifugal separation (8,000 r.p.m., 40 minutes) to obtain a pigment dispersion solution (carbon concentration: 14.4 wt %).

| | |
|---|---|
| Pigment dispersion solution obtained above | 35 parts by weight |
| Ethylene glycol (S.P. value: about 18) | 10 parts by weight |
| Propylene glycol monobutyl ether (S.P. value: about 10.5, γ = 26 mN/m) | 7 parts by weight |
| Urea | 5 parts by weight |
| Pure water | 43 parts by weight |

Respective components shown above were thoroughly mixed and then filtered under pressure through a 1-μm filter to prepare an ink.

COMPARATIVE EXAMPLE 1

An ink was prepared in the same manner as in Example 1 except for omitting diethylene glycol monobutyl ether (S.P. value: about 10.5, γ=34 mN/m) and changing the amount of pure water to 34.4 parts by weight. The glycerin has an S.P. value of 20 and γ=63 mN/m.

COMPARATIVE EXAMPLE 2

An ink was prepared in the same manner as in Example 2 except for changing the amount of propylene glycol monobutyl ether (S.P. value: about 10.5, γ=26 mN/m) to 0.5 parts by weight and the amount of pure water to 50 parts by 15 weight.

COMPARATIVE EXAMPLE 3

| | |
|---|---|
| Carbon black (Black Pearl L) | 5 parts by weight |
| Styrene-sodium maleate copolymer | 1 part by weight |
| Glycerin (S.P. value: about 20) | 15 parts by weight |
| Diethylene glycol monobutyl ether (S.P. value: about 10.5, γ = 34 mN/m) | 5 parts by weight |
| N,N-Bis(2-hydroxyethyl)-2-aminomethylethanesulfonic acid | 0.5 parts by weight |
| NaOH | 0.1 part by weight |
| Pure water | 73.4 parts by weight |

A carbon black dispersion solution was prepared from carbon black, styrene-sodium maleate copolymer and pure water, then thoroughly mixed with other components shown above and filtered under pressure to prepare an ink.

COMPARATIVE EXAMPLE 4

| | |
|---|---|
| Carbon black (Mitsubishi MA-100) | 4 parts by weight |
| Styrene-sodium maleate copolymer | 1 part by weight |
| Glycerin (S.P. value: about 20, γ = 63 mN/m) | 15 parts by weight |
| N,N-Bis(2-hydroxyethyl)-2-aminomethylethanesulfonic acid | 0.5 parts by weight |
| NaOH | 0.1 part by weight |
| Pure water | 79.4 parts by weight |

A carbon black dispersion solution was prepared from carbon black, styrene-sodium maleate copolymer and pure water, then thoroughly mixed with other components shown above and filtered under pressure to prepare an ink.

TEST EXAMPLE 1

Using the inks obtained in Examples 1 and 2 and Comparative Examples 1 to 4, the following evaluations (1) to (11) were performed.

(1) Surface Tension of Ink

The ink surface tension was measured in an environment of 23° C. and 55% RH using a Wilhelmy's surface balance.

(2) Viscosity of Ink

The ink viscosity was measured in an environment of 23° C. and 55% RH at a shear rate of 1,400 S$^{-1}$.

(3) Electric Conductivity of Ink

The ink electric conductivity was measured in an environment of 23° C. and 55% RH using a conductivity meter (AOL-40, manufactured by DKK).

(4) Number Average Dispersion Particle Size and Dispersion Particle Size Distribution of Ink The number average dispersion particle size and dispersion particle size distribution of ink were measured at 23° C. using Microtrup UPA (manufactured by Leeds & Northrup).

(5) Number of Particles of >0.5 μm Contained in Ink

Particles having a particle size in excess of 0.5 μm were counted at 23° C. using Accusizer 770A Optical Particle Sizer (manufactured by Particle Sizing Systems) and the value obtained was calculated in terms of a value per 1 dm$^3$.

(6) Ink Drop Amount

Ink was ejected three times in an environment of 23° C. and 55% RH using a prototype head (400 dpi) at a frequency of 6 kHz and ¼ tone (2035×128 pulse) and received in a small piece ink absorber. The weight was determined and the amount of ink ejected in one drop was calculated.

(7) Drying Time Test

A solid image of 10 mm×50 mm having an image area ratio of 100% was printed on a representative plain paper FX-L (produced by Fuji Xerox Co., Ltd.) in an environment of 23° C. and 55% RH using a thermal ink jet printer having a resolution of 600 dpi manufactured as a prototype for evaluation. The time period from the printing until the droplet was not visually observed on the paper was determined.

(8) Image Quality Test

A 1 dot-line solid image was test printed on a representative plain paper FX-L (produced by Fuji Xerox Co., Ltd.) using a thermal ink jet printer having a resolution of 400 dpi manufactured as a prototype for evaluation. The image quality was evaluated by examining blotting of lines and uniformity of edges in the solid image according to the following criteria.

a) Blotting of Lines
○: No blotting.
Δ: Slightly blotted.
X: Blotted like barb in many portions.

b) Solid Uniformity
○: No disorder.
Δ: Slightly disordered.
X: Indented and no smoothness.

(9) Rub Resistance Test

An image was printed using a thermal ink jet printer having a resolution of 400 dpi manufactured as a prototype for evaluation. One day after the printing, the image area was rubbed with a finger and the degree of color falling and staining on the non-image area were evaluated according to the following criteria:

○: No reduction in the image density and completely no staining on the non-image area.
Δ: Almost no reduction in the image density but the non-image area was slightly stained.
X: Image density was reduced and staining on the non-image area was conspicuous.

(10) Clogging Resistance Test

After stopping ejection in a thermal ink jet printer having a resolution of 400 dpi manufactured as a prototype for evaluation, the ink in an uncapped state was left standing in an environment of 23° C. and 55% RH and then the ejection was restarted. How long the ink was left standing until the image disorder occurred on restarting of the ejection was determined. The evaluation was made according to the following criteria:

○: minute or more
Δ: from 0.5 to 1 minute
X: less than 0.5 minute

(11) Ink Storage Stability Test

After storage at 60° C. or −20° C. for one month, the ink was again filtered through a 1-μm filter and then used for printing in a thermal ink jet printer having a resolution of 400 dpi. The evaluation was made according to the following criteria:

○: No change in the filterability after storage and also no change in the image density.
Δ: The filtration rate was slightly reduced after storage but no change in the image density.
X: After storage, the ink heavily caused filter clogging and the image density was greatly reduced.

TABLE 1

|  | Examples | | Comparative Examples | | | |
|---|---|---|---|---|---|---|
|  | 1 | 2 | 1 | 2 | 3 | 4 |
| Surface Tension of Ink (mN/m) | 37 | 34 | 60 | 37 | 37 | 57 |
| Viscosity of Ink (mpas) | 3.0 | 2.8 | 2.3 | 2.3 | 3.4 | 2.5 |
| Electric Conductivity of Ink (S/m) | 0.12 | 0.18 | 0.16 | 0.22 | 0.15 | 0.15 |
| Number Average Dispersion Particle Size of Ink (nm) | 27 | 41 | 25 | 40 | 37 | 48 |
| Particle Size Distribution | 1.8 | 2.2 | 1.8 | 2.0 | 2.7 | 2.3 |
| Number of Particles of >0.5 μm (×10$^{10}$) | 0.4 | 2.4 | 0.5 | 2.0 | 12.5 | 2.5 |
| Ink Drop Amount (ng) | 48 | 52 | 51 | 49 | 46 | 49 |
| Drying Time Test (sec) | 2 | 1 | 40 | 15 | 2 | 40 |
| Image Quality Test a) | ○ | ○ | ○ | x | ○ | ○ |
| Image Quality Test b) | ○ | ○ | ○ | x | ○ | ○ |
| Rub Resistance Test | ○ | ○ | x | Δ | ○ | x |
| Clogging Resistance Test | ○ | ○ | ○ | ○ | x | ○ |
| Ink Storage Stability Test | ○ | ○ | ○ | ○ | x | ○ |

EXAMPLE 3

Microjet Black CW-1 (produced by Orient KK) was subjected to centrifugal separation (8,000 r.p.m., 20 minutes) and filtered under pressure through a 5-μm filter and then through a 2-μm filter to obtain a pigment dispersion solution (carbon concentration: 15.7 wt %).

| Carbon black dispersion solution obtained above | 25 parts by weiqht |
|---|---|
| Triethylene glycol monobutyl ether (S.P. value: about 10, γ = 34 mN/m) | 4 parts by weight |
| Propylene glycol (S.P. value: about 16) | 10 parts by weight |
| SURFYNOL 440 (HLB: about 6) | 0.3 parts by weight |
| Urea | 3 parts by weight |
| Pure water | 57.7 parts by weight |

Respective components shown above were thoroughly mixed and then filtered under pressure through a 1-μm filter to prepare an ink. The viscosity, surface tension, electric conductivity, number average dispersion particle size, particle size distribution and number of particles having a particle size of >0.5 μm of the ink were 2.6 mpas, 29 mN/m, 0.09 s/m, 24 nm, 1.9 and 1.1×10$^{10}$ particles, respectively. The drop amount was 51 ng, the drying time was 3 seconds and the test results on the image quality, rub resistance, clogging resistance and ink storage 15 stability all were ○.

EXAMPLE 4

Cab-o-jet-300 (produced by Cabot Co.) was treated in an ultrasonic homogenizer for 30 minutes, diluted with water to a concentration of 10% and then subjected to centrifugal separation (7,000 r.p.m., 20 minutes) to obtain a pigment dispersion solution (carbon concentration: 8.8 wt %).

| Carbon black dispersion solution obtained above | 50 parts by weiqht |
|---|---|
| Diethylene glycol (S.P. value: about 15) | 10 parts by weight |
| N-Methyl-2-pyrrolidone (S.P. value: about 11, γ = 48 mN/m) | 5 parts by weight |

| | |
|---|---|
| Dipropylene glycol monobutyl ether (S.P. value: about 10, γ = 29 mN/m) | 5 parts by weight |
| Pure water | 30 parts by weight |

Respective components shown above were thoroughly mixed and then filtered under pressure through a 1-μm filter to prepare an ink. The viscosity, surface tension, electric conductivity, number average dispersion particle size, particle size distribution and number of particles having a particle size of >0.5 μm of the ink were 2.5 mPas, 33 mN/m, 0.18 S/m, 25 nm, 2.1 and $1.6\times10^{10}$ particles, respectively. The drop amount was 49 ng, the drying time was 1.5 seconds and the test results of the image quality, rub resistance, clogging resistance and ink storage stability all were ○.

EXAMPLE 5

Carbon black (Raven 5750) was subjected to surface oxidation treatment with sodium hypochlorite, desalted, adjusted to have a pH of 7.5 and dispersed in pure water as a solvent using an ultrasonic homogenizer. After the dispersion, the solution was subjected to centrifugal separation (7,000 r.p.m., 20 minutes) to obtain a pigment dispersion solution (carbon concentration: 11 wt %).

| | |
|---|---|
| Pigment dispersion solution obtained above | 40 parts by weight |
| Triethylene glycol (S.P. value: about 14) | 10 parts by weight |
| Propylene glycol monopropyl ether (S.P. value: about 11, γ = 26 mN/m) | 8 parts by weight |
| Polyoxyethylene alkyl ether | 0.3 parts by weight |
| Pure water | 41.7 parts by weight |

Respective components shown above were thoroughly mixed and then filtered under pressure through a 1-μm filter to prepare an ink. The viscosity, surface tension, electric conductivity, number average dispersion particle size, particle size distribution and number of particles having a particle size of >0.5 μm of the ink were 2.5 mPas, 36 mN/m, 0.17 S/m, 59 nm, 2.1 and $2.8\times10^{10}$ particles, respectively. The drop amount was 47 ng, the drying time was 2 seconds and the test results of the image quality, rub resistance, clogging resistance and ink storage stability all were ○.

EXAMPLE 6

Carbon black (Mitsubishi MA-100) was graft polymerized by sodium styrene sulfonate, dispersed in pure water as a solvent using an ultrasonic homogenizer, and then subjected to centrifugal separation (8,000 r.p.m., 40 minutes) to obtain a pigment dispersion solution (carbon concentration: 7.8 wt %).

| | |
|---|---|
| Pigment dispersion solution obtained above | 60 parts by weight |
| Thiodiethanol | 20 parts by weight |
| Polyoxyethylene polyoxypropylene block copolymer | 0.1 part by weight |
| Diethylene glycol monohexyl ether (S.P. value: about 10, γ =29 mN/m) | 3 parts by weight |
| Pure water | 16.9 parts by weight |

Respective components shown above were thoroughly mixed and then filtered under pressure through a 1-μm filter to prepare an ink. The viscosity, surface tension, electric conductivity, number average dispersion particle size, particle size distribution and number of particles having a particle size of >0.5 μm of the ink were 2.6 mPas, 33 mN/m, 0.15 S/m, 47 nm, 2.4 and $2.4\times10^{10}$ particles, respectively. The drop amount was 53 ng, the drying time was 1 second and the test results of the image quality, rub resistance, clogging resistance and ink storage stability all were ○.

EXAMPLE 7

Carbon black (Special Bk 4A) was plasma treated, dispersed in pure water as a solvent to have a carbon concentration of 20% using a high-pressure homogenizer, and then subjected to centrifugal separation (7,000 r.p.m, 30 minutes) to obtain a pigment dispersion solution (carbon concentration: 15.6 wt %).

| | |
|---|---|
| Pigment dispersion soultion obtained above | 5 parts by weight |
| Trimethylolpropane | 15 parts by weight |
| Glycerin (S.P. value: about 20) | 5 parts by weight |
| Propylene glycol monobutyl ether (S.P. value: about 10.5, γ = 26 mN/m) | 5 parts by weight |
| Polyoxyethylene perfluoroalkyl ether (HLB: about 13) | 0.01 part by weight |
| Pure water | 70 parts by weight |

Respective components shown above were thoroughly mixed and then filtered under pressure through a 1-μm filter to prepare an ink. The viscosity, surface tension, electric conductivity, number average dispersion particle size, particle size distribution and number of particles having a particle size of >0.5 μm of the ink were 3.3 mPas, 23 mN/m, 0.14 S/m, 44 nm, 2.3 and $1.7\times10^{10}$ particles, respectively. The drop amount was 44 ng, the drying time was 2 seconds and the test results of the image quality, rub resistance, clogging resistance and ink storage stability all were ○.

EXAMPLE 8

| | |
|---|---|
| Pigment dispersion solution used in Example 2 | 30 parts by weight |
| 1,5-Pentanediol (S.P. value: about 12.5) | 10 parts by weight |
| Dipropylene glycol monoethyl ether (S.P. value: about 10.5, γ = 28 mN/m) | 8 parts by weight |
| Isopropyl alcohol | 3 parts by weight |
| Silicone polyoxyethylene adduct (HLB: about 7) | 0.1 part by weight |
| Polyoxyethylene oleyl ether (HLB: about 12) | 0.3 parts by weight |
| Pure water | 48.6 parts by weight |

Respective components shown above were thoroughly mixed and then filtered under pressure through a 1-μm filter to prepare an ink. The viscosity, surface tension, electric conductivity, number average dispersion particle size, particle size distribution and number of particles having a particle size of >0.5 μm of the ink were 3.0 mPas, 33 mN/m, 0.16 S/m, 40 nm, 2.4 and $1.3\times10^{10}$ particles, respectively. The drop amount was 31 ng, the drying time was 4 seconds and the test results of the image quality, rub resistance, clogging resistance and ink storage stability all were ○. With respect to the drop amount, the amount of ink ejected was measured using a prototype head of 600 dpi under the same conditions as in Example 1.

EXAMPLE 9

| | |
|---|---|
| Pigment dispersion solution used in Example 1 | 50 parts by weight |
| Dipropylene glycol (S.P. value: about 13) | 15 parts by weight |
| Diethylene glycol monobutyl ether (S.P. value: about 10.5, γ = 34 mN/m) | 5 parts by weight |
| Sodium benzoate | 0.5 parts by weight |
| Styrene-acrylic acid ester-acrylic acid emulsion (average molecular weight: 12,000, acid value: about 20) | 1.0 part by weight |
| Pure water | 28.5 parts by weight |

Respective components shown above were thoroughly mixed and then filtered under pressure through a 1-μm filter to prepare an ink. The viscosity, surface tension, electric conductivity, number average dispersion particle size, particle size distribution and number of particles having a particle size of >0.5 μof the ink were 3.2 mPas, 36 mN/m, 0.22 S/m, 40 nm, 2.4 and $1.5 \times 10^{10}$ particles, respectively. The drop amount was 31 ng, the drying time was 1.5 seconds and the test results of the image quality, rub resistance, clogging resistance and ink storage stability all were ○. With respect to the drop amount, the amount of ink ejected was measured using a prototype head of 600 dpi under the same conditions as in Example 1.

EXAMPLE 10

| | |
|---|---|
| Pigment dispersion solution used in Example 3 | 30 parts by weight |
| Glucose | 10 parts by weight |
| 1,5-Pentanediol (S.P. value: about 12.5) | 10 parts by weight |
| Dipropylene glycol monopropyl ether (S.P. value: about 10.5, γ = 28 mN/m) | 12 parts by weight |
| SURFYNOL 104 | 0.1 part by weight |
| N-(2-Acetamido)iminodiacetic acid | 0.5 parts by weight |
| LiOH | 0.1 part by weight |
| Pure water | 37.3 parts by weight |

Respective components shown above were thoroughly mixed and then filtered under pressure through a 1-μm filter to prepare an ink. The viscosity, surface tension, electric conductivity, number average dispersion particle size, particle size distribution and number of particles having a particle size of >0.5 μm of the ink were 3.4 mpas, 30 mN/m, 0.22 S/m, 25 nm, 2.1 and $3.9 \times 10^{10}$ particles, respectively. The drop amount was 45 ng, the drying time was 1 second and the test results of the image quality, rub resistance and clogging resistance were ○. The ink storage stability was Δ.

EXAMPLE 11

A plasma treated phthalocyanine pigment was dispersed in water as a solvent to have a pigment concentration of 20% using a high-pressure homogenizer, subjected to centrifugal separation (7,000 r.p.m., 30 minutes), adsorbed to activated carbon and then filtered through a 5-μfilter to obtain a pigment dispersion solution (phthalocyanine pigment concentration: 14.7%).

| | |
|---|---|
| Pigment dispersion solution obtained above | 25 parts by weight |
| Glycerin (S.P. value: about 20) | 15 parts by weight |
| Dipropylene glycol monobutyl ether (S.P. value: about 10, γ = 29 mN/m) | 5 parts by weight |
| Polyoxyethylene polyoxypropylene block copolymer (HLB: about 10) | 0.3 parts by weight |
| PROXEL GXL | 0.03 parts by weight |
| Pure water | 53.7 parts by weight |

Respective components shown above were thoroughly mixed and then filtered under pressure through a 2-μm filter to prepare an ink. The viscosity, surface tension, electric conductivity, number average dispersion particle size, particle size distribution and number of particles having a particle size of >0.5 μm of the ink were 2.8 mPas, 32 mN/m, 0.22 S/m, 87 nm, 2.4 and $5.7 \times 10^{10}$ particles, respectively. The drop amount was 46 ng, the drying time was 1.5 seconds and the test results of the image quality, rub resistance and clogging resistance were ○. The ink storage stability was Δ.

EXAMPLE 12

An ink was prepared using the same composition in the same manner as in Example 11 except for omitting centrifugal separation and adsorption to activated carbon in Example 11. The viscosity of the ink was 2.8 mPas, the surface tension was 32 mN/m, the electric conductivity, number average dispersion particle size, particle size distribution and number of particles having a particle size of >0.5 μm were 0.24 S/m, 110 nm, 3.2 and $9.0 \times 10^{10}$ particles, respectively, and the Fe and Mg contents were 15 ppm and 10 ppm, respectively. The drop amount was 46 ng and the drying time was 1.5 seconds. The test results of the image quality was ○ and the rub resistance, ink storage stability and clogging resistance were Δ.

COMPARATIVE EXAMPLE 5

| | |
|---|---|
| Pigment dispersion solution used in Example 1 | 50 parts by weight |
| Diethylene glycol | 15 parts by weight |
| Tetraethylene glycol monomethyl ether (S.P. value: about 10.5, γ = 50 mN/m) | 5 parts by weight |
| Thiourea | 5 parts by weight |
| Pure water | 25 parts by weight |

Respective components shown above were thoroughly mixed and then filtered under pressure through a 1 μm filter to prepare an ink. The viscosity of the ink was 2.7 mpas, the surface tension was 47 mN/m, the electric conductivity, number average dispersion particle size, particle size distribution and number of particles having a particle size of >0.5 μm were 0.14 S/m, 28 nm, 1.9 and $0.8 \times 10^{10}$ particles, respectively. The drop amount was 53 ng and the drying time was 30 seconds. The test results of the image quality, clogging resistance and ink storage stability were ○ and the rub resistance was X.

COMPARATIVE EXAMPLE 6

| | |
|---|---|
| Pigment dispersion solution used in Example 2 | 35 parts by weight |
| Diethylene glycol | 5 parts by weight |
| Propylene glycol monobutyl ether (S.P. value: about 10.5, γ = 26 mN/m) | 20 parts by weight |
| Pure water | 40 parts by weight |

Respective components shown above were thoroughly mixed and then filtered under pressure through a 1-μm filter to prepare an ink. The viscosity, surface tension, electric conductivity, number average dispersion particle size, particle size distribution and number of particles having a particle size of >0.5 μm of the ink were 3.2 mPas, 33 mN/m, 0.16 S/m, 44 nm, 2.8 and $7.5 \times 10^{10}$ particles, respectively. The drop amount was 48 ng and the drying time was 1 second. The test results of the rub resistance and clogging resistance were ○ and the image quality and ink storage stability were X.

EXAMPLE 13

| | |
|---|---|
| Pigment dispersion solution used in Example 4 | 50 parts by weight |
| 1,2,6-Hexanetriol (S.P. value: about 15) | 10 parts by weight |
| Ethylene glycol monopropyl ether (S.P. value: about 11, γ =32 mN/m) | 10 parts by weight |
| Oxyethylene oleyl ether (HLB: about 10) | 0.2 parts by weight |
| Pure water | 29.8 parts by weight |

Respective components shown above were thoroughly mixed and then filtered under pressure through a 1-μm filter to prepare an ink. The viscosity, surface tension, electric conductivity, number average dispersion particle size, particle size distribution and number of particles having a particle size of >0.5 μm of the ink were 2.5 mPas, 39 mN/m, 0.13 S/m, 20 nm, 2.1 and $1.2 \times 10^{10}$ particles, respectively. The drop amount was 27 ng. With respect to the drop amount, the amount of ink ejected was measured using a prototype head of 600 dpi under the same conditions as in Example 1. The image quality, rub resistance, clogging resistance, drying time and ink storage stability were tested using a thermal ink jet printer having a resolution of 600 dpi manufactured as a prototype for evaluation where one droplet is formed by applying a driving signal constituted of a main pulse, a prepulse and a quiescent time between the prepulse and the main pulse. The drying time was 4 seconds and the tests results of all other items were ○.

EXAMPLE 14

An ink having the following composition was prepared.
Cyan Ink

| | |
|---|---|
| Projet Fast Cyan 2 (produced by ZENECA) | 4 parts by weight |
| Butyl carbitol | 5 parts by weight |
| Thiodiethanol | 15 parts by weight |
| Pure water | 76 parts by weight |

Respective components shown above were thoroughly mixed and dissolved and filtered under pressure through a 0.45-μm filter to prepare an ink.

Magenta Ink

An ink was prepared using the same composition as above by thoroughly mixing and dissolving respective components and filtering under pressure the mixed solution through a 0.45-μm filter except for using Projet Fast Magenta 2 in place of Projet Fast Cyan 2 (produced by ZENECA).

Yellow Ink

An ink was prepared using the same composition as above by thoroughly mixing and dissolving respective components and filtering under pressure the mixed solution through a 0.45-μm filter except for using Projet Fast Yellow 2 in place of Projet Fast Cyan 2 (produced by ZENECA).

TEST EXAMPLE 2

(12) Overprinted Image Quality Test

Using the ink of Example 1 and the cyan, magenta and yellow inks obtained in Example 14, the following evaluation was made.

A solid image pattern having black 1-dot lines and respective colors adjacent thereto on a color background was test printed on a representative plain paper FX-L (produced by Fuji Xerox Co.) using a thermal ink jet printer having a resolution of 400 dpi manufactured as a prototype for evaluation. Blotting of lines and uniformity of areas adjacent to the solid image were examined and evaluated according to the following criteria.

a) Blotting of Lines
  ○: No blotting.
  Δ: Slightly blotted.
  X: Blotted like barb in many portions.
b) Solid Uniformity
  ○: No disorder.
  Δ: Slightly disordered.
  X: Indented and no smoothness.

The results of evaluations a) and b) were ○ in all inks.

TEST EXAMPLE 3

Using the ink of Example 1 and a fixing agent having a composition shown below, the following evaluation was made.

Fixing Agent A

| | |
|---|---|
| Styrene-lithium maleate copolymer | 5 parts by weight |
| Ethylene glycol | 15 parts by weight |
| Polyoxyethylene oleyl ether | 0.2 parts by weight |
| Isopropyl alcohol | 3 parts by weight |
| Pure water | 76.8 parts by weight |

Fixing Agent A was ejected on a representative plain paper FX-L (produced by Fuji Xerox Co.) using a thermal ink jet printer having a resolution of 400 dpi manufactured as a prototype for evaluation and after 5 seconds, the ink of Example 1 was overprinted. Thereafter, the image quality test in (9) above was performed. The result of the image quality test was ○ and the image density was higher than that in Example 1.

TEST EXAMPLE 4

Using the ink of Example 2 and a fixing agent having a composition shown below, the following evaluation was made.

Fixing Agent B

| | |
|---|---|
| Benzalkonium chloride | 1 part by weight |
| Polyallylamine hydrochloride | 5 parts by weight |
| Glycerin | 15 parts by weight |
| Pure water | 79 parts by weight |

An image quality test was performed in the same manner as in Test Example 3. The result of the image quality test was ◯ and the image density was higher than that in Example 2.

TEST EXAMPLE 5

Using the ink of Example 1, the following evaluation was made.

The amount of ink ejected per one drop and the drying time were determined in the same manner as in (6) and (7) of Test Example 1 except for using an ink jet printer of 800 dpi manufactured as a prototype for evaluation. Furthermore, 8 point letters were printed on a representative plain paper FX-L (produced by Fuji Xerox Co.) using the same printer. The amount of ink ejected per one drop was 13 ng, the drying time was 1 seconds and the appearance quality of letters was higher than that obtained by the printing in a printer used in (8) of Test Example 1.

The ink for ink jet recording of the present invention is dried at a high rate on a plain paper, assures excellent properties in the print quality, water resistance/rub resistance and long-term storage stability, and does not cause clogging and the like.

What is claimed is:

1. An ink for ink jet recording comprising water, a pigment that is self-dispersible-in-water, and a water-soluble organic solvent, wherein said ink contains a water-soluble organic compound having an S.P. value of 12 or less and a surface tension at 25° C. of less than 40 mN/m in an amount of from 3.0 to 10.0 wt % based on the entire weight of the ink, wherein said self-dispersible-in-water pigment has a number average dispersion particle size of from 15 to 50 nm, and the drying time of said ink is less than 5 seconds when a solid image having an image area ratio of 100% is printed on a plain paper with said ink.

2. The ink for ink jet recording as claimed in claim 1, wherein the water self-dispersible pigment has a dispersion particle size distribution of 3.5 or less.

3. The ink for ink jet recording as claimed in claim 1, wherein the number of particles having a particle size in excess of 0.5 μm contained in the ink is $6 \times 10^{10}$ particles/dm$^3$ or less.

4. The ink for ink jet recording as claimed in claim 1, wherein the water-soluble organic compound has a weight molecular weight of less than 400.

5. The ink for ink jet recording as claimed in claim 1, wherein the water-soluble organic compound has an S.P. value of 8 or more.

6. The ink for ink jet recording as claimed in claim 1, wherein the water-soluble organic compound is a compound represented by R—O—X$_n$H, wherein R is a functional group selected from the group consisting of alkyl, alkenyl, alkynyl, phenyl, alkylphenyl and cycloalkyl having from 1 to 8 carbon atoms, X represents oxyethylene or oxypropylene, and n is an integer of from 1 to 8.

7. The ink for ink jet recording as claimed in claim 1, wherein the ink has a surface tension of from 20 to 40 mN/m.

8. The ink for ink jet recording as claimed in claim 1, wherein the ink has a viscosity of from 1.8 to 4.0 mPas.

9. The ink for ink jet recording as claimed in claim 1, wherein the ink has an electric conductivity of from 0.03 to 0.4 S/m.

10. A process for producing an ink for ink jet recording, which comprises: dispersing a pigment that is dispersible-in-water in water by using one of an ultrasonic homogenizer and a high-pressure homogenizer; and mixing the dispersed pigment, a water-soluble solvent and a water-soluble organic compound having an S.P. value of 12 or less and a surface tension at 25° C. of less than 40 mN/m.

11. The process for producing an ink for ink jet recording as claimed in claim 10, which further comprises a step of removing coarse particles by centrifugal separation.

12. An ink jet recording method comprising ejecting an ink according to claim 1 from an orifice in response to a recording signal.

13. The ink jet recording method as claimed in claim 12, wherein the ink is ejected by the action of heat energy upon the ink.

14. The ink jet recording method as claimed in claim 12, wherein a plurality of pulses is applied to form and eject one ink droplet.

15. The ink jet recording method as claimed in claim 12, which further comprises a step of mixing the ink ejected and a fixing agent on a recording material.

16. The ink jet recording method as claimed in claim 14, wherein the amount of ink ejected is from 1 to 20 ng per one drop.

17. The ink for ink jet recording as claimed in claim 6, wherein the water-soluble organic compound is a compound represented by R—O—X$_n$H, so that when X is oxyethylene, R is a functional group selected from the group consisting of alkyl, alkenyl, alkynyl, phenyl, alkylphenyl and cycloalkyl from 3 to 8 carbon atoms; and, when X is oxypropylene, R is a functional group selected from the group consisting of alkyl, alkenyl, alkynyl, phenyl, alkylphenyl and cycloalkyl having from 2 to 8 carbon atoms.

* * * * *